(12) United States Patent
Milford

(10) Patent No.: US 11,172,244 B2
(45) Date of Patent: Nov. 9, 2021

(54) PROCESS CONTROLLER FOR CREATION OF ABR VOD PRODUCT MANIFESTS

(71) Applicant: ARRIS Enterprises LLC, Suwanee, GA (US)

(72) Inventor: Matthew A. Milford, Waxhaw, NC (US)

(73) Assignee: ARRIS Enterprises LLC, Suwanee, GA (US)

(*) Notice: Subject to any disclaimer, the term of this patent is extended or adjusted under 35 U.S.C. 154(b) by 132 days.

(21) Appl. No.: 16/396,639

(22) Filed: Apr. 27, 2019

(65) Prior Publication Data

US 2019/0364322 A1 Nov. 28, 2019

Related U.S. Application Data

(60) Provisional application No. 62/665,694, filed on May 2, 2018.

(51) Int. Cl.

| H04N 21/238 | (2011.01) |
|---|---|
| H04N 21/262 | (2011.01) |
| H04N 21/2665 | (2011.01) |
| H04N 21/2343 | (2011.01) |
| H04N 21/845 | (2011.01) |
| H04N 21/8543 | (2011.01) |
| H04N 21/6379 | (2011.01) |

(52) U.S. Cl.
CPC ..... *H04N 21/26283* (2013.01); *H04N 21/238* (2013.01); *H04N 21/234309* (2013.01); *H04N 21/2665* (2013.01); *H04N 21/26258* (2013.01); *H04N 21/6379* (2013.01); *H04N 21/8455* (2013.01); *H04N 21/8456* (2013.01); *H04N 21/8543* (2013.01)

(58) Field of Classification Search
CPC ......... H04N 21/26258; H04N 21/8543; H04N 21/8456; H04N 21/26283; H04N 21/2665; H04N 21/234309; H04N 21/8455; H04N 21/238; H04N 21/6379
See application file for complete search history.

(56) References Cited

U.S. PATENT DOCUMENTS

| 2005/0190872 A1* | 9/2005 | Seong ................. H04N 21/242 375/354 |
|---|---|---|
| 2009/0133059 A1 | 5/2009 | Gibbs |
| 2010/0158109 A1 | 6/2010 | Dahlby |
| 2012/0137337 A1 | 5/2012 | Sigmon, Jr. |

(Continued)

*Primary Examiner* — Nasser M Goodarzi
*Assistant Examiner* — Patrick A Ryan
(74) *Attorney, Agent, or Firm* — Chernoff, Vilhauer, McClung & Stenzel, LLP

(57) ABSTRACT

A method is provided for coordinating preparation of video-on-demand (VOD) products that are to be delivered as adaptive-bit-rate (ABR) video streams. In the method, actual start and actual stop times are received from a video product generator for each of a plurality of VOD products processed by the video product generator. The video product generator is configured to create VOD products in video transport streams from source assets. Responsive to receipt of the start and stop times, a transcoder is instructed to insert into a video transport stream for each of the VOD products encoder boundary points and IDR frames at specified times in each of the VOD products. The specified times include offset start and offset stop times of each of the VOD products.

20 Claims, 6 Drawing Sheets

(56) References Cited

U.S. PATENT DOCUMENTS

| | | | |
|---|---|---|---|
| 2013/0308638 A1* | 11/2013 | Grossman | H04N 21/242 370/390 |
| 2014/0068690 A1* | 3/2014 | Luthra | H04N 21/234309 725/110 |
| 2014/0282792 A1* | 9/2014 | Bao | H04N 21/44004 725/116 |
| 2015/0256906 A1* | 9/2015 | Jones | H04L 65/4076 725/109 |
| 2015/0281752 A1* | 10/2015 | Van Veldhuisen | H04N 21/8456 725/116 |
| 2016/0191961 A1* | 6/2016 | Fisher | H04N 21/234309 725/116 |
| 2017/0055039 A1 | 2/2017 | Earle | |
| 2017/0171577 A1* | 6/2017 | Kipp | H04N 21/242 |
| 2018/0176616 A1* | 6/2018 | Green | H04N 21/8456 |

\* cited by examiner

PACKAGER MANIFEST

VALIDATE CUE ANNOTATIONS AND
PRODUCTION ARE CORRECT

VPC MANIFEST

ONLY CONTAINS ACTUAL
PRODUCT CHUNKS

PROCESS CONTROLLER FOR CREATION OF ABR VOD PRODUCT MANIFESTS

CROSS REFERENCE TO RELATED APPLICATION

This Application claims priority under 35 U.S.C. § 119(e) from earlier filed U.S. Provisional Application Ser. No. 62/665,694, filed May 2, 2018 which is incorporated herein by reference in its entirety.

BACKGROUND

Subscription based video content service providers employ networks such as direct broadcast satellite (DBS), over-the-air, cable and/or telecommunication distribution systems to distribute video content as linear video or video-on-demand (VOD) streams. Such systems typically transmit content to subscribers in an encoded form as a digital MPEG video stream and each subscriber has a client device such as a set-top box or the like that is capable of decoding the MPEG video stream. Beyond providing linear and video-on-demand (VOD) content, service providers are now interested in providing Internet-based or over-the-top (OTT) content, such as web pages, video games, voice-over-IP (VOIP) telephony services that may include video, still images, data, graphics, interactive media and streaming delivery of audiovisual content including movies, and the like.

As the Internet has become more dynamic, including video content on web pages and requiring applications or scripts for decoding the video content, service providers have adapted to allow subscribers the ability to view these dynamic web pages. In order to transmit a dynamic web page to a requesting subscriber in encoded form, the service provider's head end retrieves the requested web page and renders the web page. Thus, the headend must first decode any encoded content that appears within the dynamic webpage. For example, if a video is to be played on the webpage, the headend must retrieve the encoded video and decode each frame of the video. The cable headend then renders each frame to form a sequence of bitmap images of the Internet web page. Thus, the web page can only be composited together if all of the content that forms the web page is first decoded. Once the composite frames are complete, the composited video is sent to an encoder transcoder, such as an MPEG transcoder to be re-encoded. The compressed MPEG video frames are then sent to an ABR packager to create an ABR manifest for the content.

SUMMARY

In accordance with one aspect of the techniques described herein, a method is provided for coordinating preparation of video-on-demand (VOD) products that are to be delivered as adaptive-bit-rate (ABR) video streams. In accordance with the method, actual start and actual stop times are received from a video product generator for each of a plurality of VOD products processed by the video product generator. The video product generator is configured to create VOD products in video transport streams from source assets. Responsive to receipt of the start and stop times for each of the VOD products, a transcoder is instructed to insert into a video transport stream for each of the VOD products encoder boundary points and IDR frames at specified times in each of the VOD products. The specified times include offset start and offset stop times of each of the VOD products. The offset start time is equal to the actual start plus an additional time period that accounts for processing delays arising between a time when the VOD products exit the video product generator and a time the transcoder begins processing the VOD products. The offset stop time is equal to the actual stop time plus the additional time period. responsive to receipt of the actual start and the actual stop times for each of the VOD products, the transcoder is further instructed to insert into the video transport stream for each of the VOD products in-band signaling markers denoting the offset start and offset stop times of each of the VOD products. A preliminary ABR manifest is requested for each of the VOD products from an ABR packager that packages the VOD products received by the ABR packager from the transcoder. The request for the preliminary manifest specifies manifest start and stop times that are expanded beyond the respective actual start and actual stop times for each of the VOD products. The preliminary manifests received from the ABR packager are trimmed so that each preliminary manifest only includes ABR chunks for a respective one of the VOD products to thereby produce final VOD product ABR manifests.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

As previously mentioned, subscription-based video content service providers would like to offer Internet- or web-based content to consumers. Described herein is a process controller for managing the overall process of creating ABR manifests and ABR video streams from source assets that are obtained from a wide variety of different content sources and which are in a wide variety of different native media formats. The source assets are first converted to video transport streams such as an MPEG transport stream, transcoded as necessary and packaged for delivery as an adaptive bit rate (ABR) video stream.

Adaptive bit rate streaming is a technique for streaming multimedia where the source asset is encoded at multiple bit rates. It is based on a series of short progressive content files applicable to the delivery of both live and on demand content. Adaptive bit rate streaming works by breaking the overall media stream into a sequence of small file downloads, each download loading one short segment, or chunk, of an overall potentially unbounded content stream.

As used herein, a chunk is a small file containing a short video segment (typically 2 to 10 seconds but can be as short as a single frame in some implementations) along with associated audio and other data. Sometimes, the associated audio and other data are in their own small files, separate from the video files and requested and processed by the ABR client(s) where they are reassembled into a rendition of the original content. Adaptive streaming may use, for instance, the Hypertext Transfer Protocol (HTTP) as the transport protocol for these video chunks. For example, 'chunks' or 'chunk files' may be short sections of media retrieved in an HTTP request by an ABR client. In some cases these chunks may be standalone files, or may be sections (i.e. byte ranges) of one much larger file. For simplicity the term 'chunk' is used to refer to both of these cases (many small files or fewer large files).

Adaptive bit rate streaming methods have been implemented in proprietary formats including HTTP Live Streaming ("HLS") by Apple, Inc., and HTTP Smooth Streaming by Microsoft, Inc. adaptive bit rate streaming has been standardized as ISO/IEC 23009-1, Information Technology—Dynamic Adaptive Streaming over HTTP ("DASH"): Part 1: Media presentation description and segment formats. Although references are made herein to these example adaptive bit rate protocols, it will be recognized by a person having ordinary skill in the art that other standards, protocols, and techniques for adaptive streaming may be used.

Figure 1:
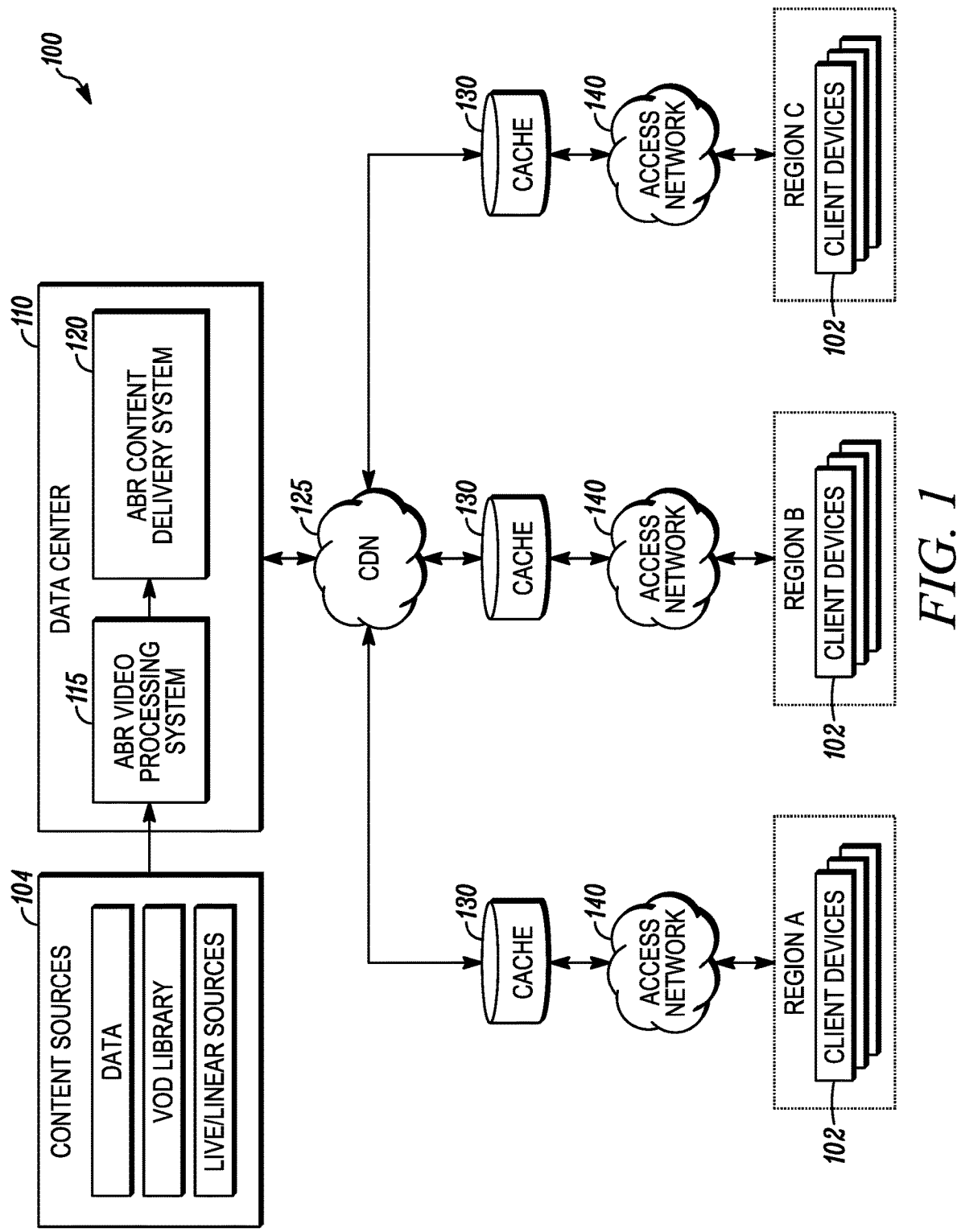
FIG. 1 shows one example of an operating environment in which the techniques, systems and devices described herein may operate.

FIG. 1 shows one example of an operating environment in which the techniques, systems and devices described herein may operate. In particular, FIG. 1 depicts a high-level functional block diagram of a representative adaptive bit rate system 100 that delivers content to adaptive bit rate client devices 102. An adaptive bit rate client device 102 is a client device capable of providing streaming playback by requesting an appropriate series of segments from an adaptive bit rate system. The ABR client devices 102 associated with users or subscribers may include a wide range of devices, including, without limitation, digital televisions, set top boxes (STBs), digital media players, mobile communication devices (e.g., smartphones) video gaming devices, video game consoles, video teleconferencing devices, and the like.

The source assets made available to the adaptive bit rate system 100 may originate from various content sources represented by content source 104, which may provide source assets such as live or linear content, VOD content and Internet-based or over-the-top (OTT) content such as data, images, video, text and the like. The source assets are provided to a data center 110 that includes an ABR video processing system 115 and an ABR content delivery system 120. ABR video processing system 115 is responsible for ingesting the source assets in their native formats (e.g., MPEG, HTMLS, JPEG, etc.) and processing them as necessary so that they can be transcoded and packaged. The ABR video processing system 115 also includes the transcoders and packagers that are responsible for preparing individual adaptive bit rate streams. A transcoder/packager is designed to encode, then fragment the media files into chunks or segments and to encapsulate those files in a container expected by the particular type of adaptive bit rate client. The adaptive bit rate segments are available at different bit rates, where the segment boundaries are aligned across the different bit rates so that clients can switch between bit rates seamlessly at the segment boundaries.

Along with the delivery of media, the packagers create the manifest files for each type of adaptive bit rate streaming protocol that is employed. In adaptive bit rate protocols, the manifest files generated may include a main or variant manifest and a profile or playlist manifest. The main manifest describes the various formats (resolution, bit rate, codec, etc.) that are available for a given asset or content stream. For each format, a corresponding profile manifest may be provided. The profile manifest identifies the media file chunks/segments that are available to the client. The ABR client determines which format the client desires, as listed in the main manifest, finds the corresponding profile manifest and location, and then retrieves media segments referenced in the profile manifest.

The ABR content delivery system 120 makes the various manifests and the ABR content available for delivery to the ABR client devices 102 over a suitable content delivery network (CDN) 125, which may be in communication with various edge caches 130. In some cases the edge caches 130 are in turn in communication with one or more client devices 102 in one or more regions through one or more access networks 140 that each serve a designated region. By way of a non-limiting example, FIG. 1 depicts an example of the data center 110 in communication with three regions A, B and C. However, the central data center 110 can be in communication with any desired number of regions. CDN 125 and access networks 140 may comprise any suitable network or combination of networks including, without limitation, IP networks, hybrid fiber-coax (HFC) networks, and the like.

It should be noted that the various systems and components of the adaptive bit rate system 100 shown in FIG. 1 may be in any suitable location or locations. To the extent they are not co-located, they may communicate over one or more networks such as an IP CDN.

Figure 2:
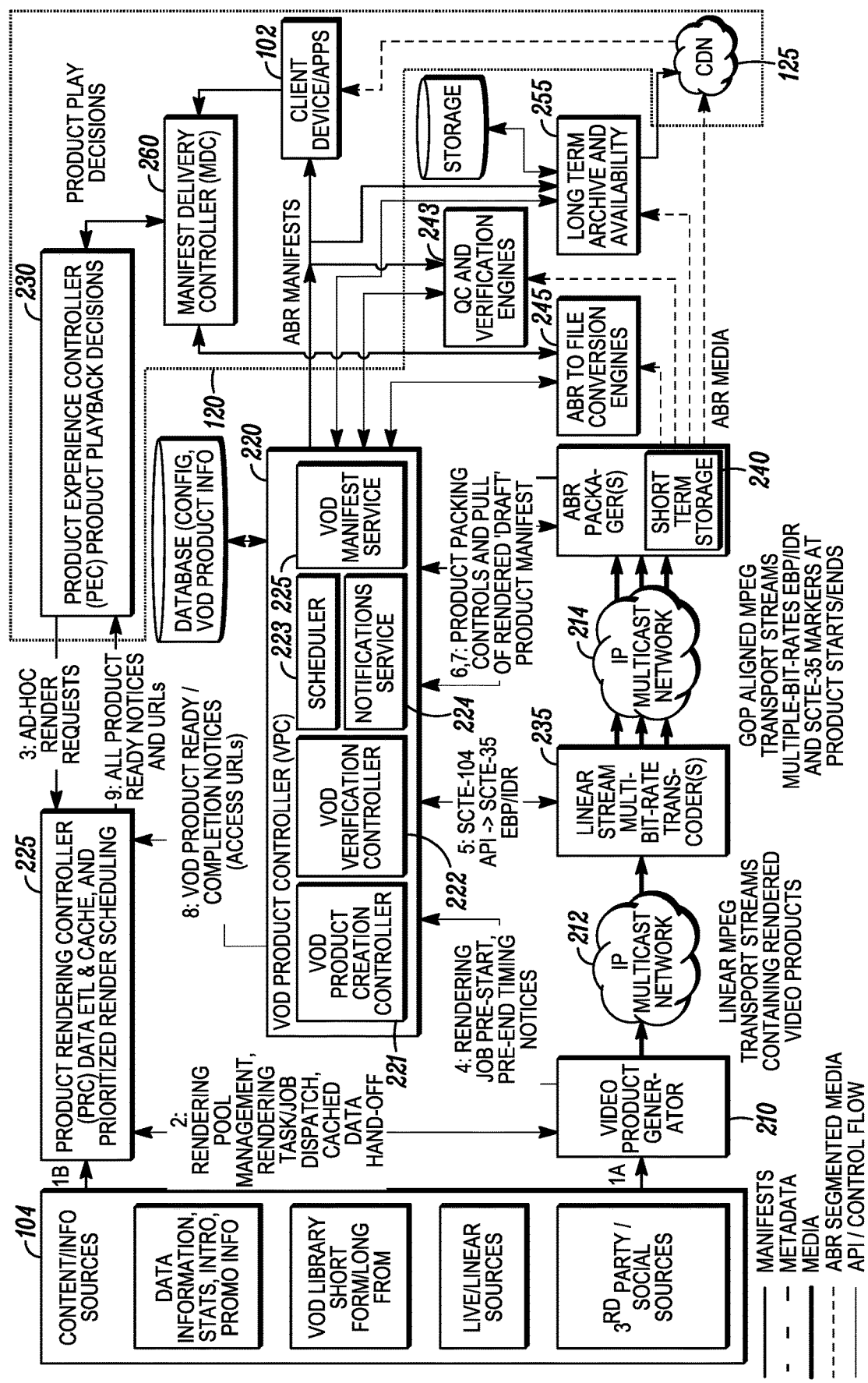
FIG. 2 shows one example of the adaptive bit rate (ABR) video processing system shown in FIG. 1.

FIG. 2 shows one example of the ABR video processing system 115. In this example the system 115 includes a video product generator 210 that ingests a wide variety of different types of source assets in different native media formats, including Internet-based content such as discussed above, and converts it into a video product in an MPEG or other type of video transport stream. The MPEG transport streams can then be transcoded and packaged as discussed above for preparing the individual ABR streams and delivering them to the ABR client devices as a VOD asset or product. One commercially available example a video product generator is the CloudTV StreamCast™ product available from ActiveVideo®.

The process of converting the source assets from their native media format to an MPEG transport stream, transcoding the MPEG transport stream and packaging the MPEG streams for delivery as a video or VOD asset or product is performed under the control of a VOD product controller 220. In one embodiment the VOD product controller 220 may include a number of functional modules or components such as, in the example of FIG. 2, a VOD product creation controller 221, a VOD verification controller, 222, a scheduler 223, a notification service 224 and a VOD manifest service 225.

FIG. 2 further illustrates one example of the communication flow that may be performed between the systems and components within the ABR video processing system 115 and between the ABR video processing system 115 and the ABR content delivery system 120. In this example the source assets that are to be processed to create a video transport stream may be obtained by the video product generator 210 either directly from the content sources 104 at 1a or from a product rendering controller (PRC) 225 at 2, which itself may receive and pre-cache the source assets from the content sources 104 at 1b so that they will be immediately available when needed. In some cases the PRC 225 may receive ad-hoc or pre-scheduled content requests at 3 from a component employed in the ABR content delivery system 120 such as the illustrative product experience controller 230, which may request the creation of specific VOD products.

Regardless of how the content is provided to the video product generator 210, once it is ready to generate a VOD product or asset it communicates with the VPC 220 at 4 by providing the VPC 220 with a VOD asset identifier and pre-start and pre-end timing notices informing the VPC 220 as to when it is to begin and end the rendering process for that asset. The pre-start and pre-end timing notices also specify the actual start and stop times of the VOD product, generally with sub-millisecond precision. When the processing by the video product generator 210 is complete, the video product generator 210 transmits the VOD product or asset in a transport stream such as an MPEG transport stream to the transcoder 235 over a network such as the illustrative IP multicast network 212.

Figures 3A, 3B:
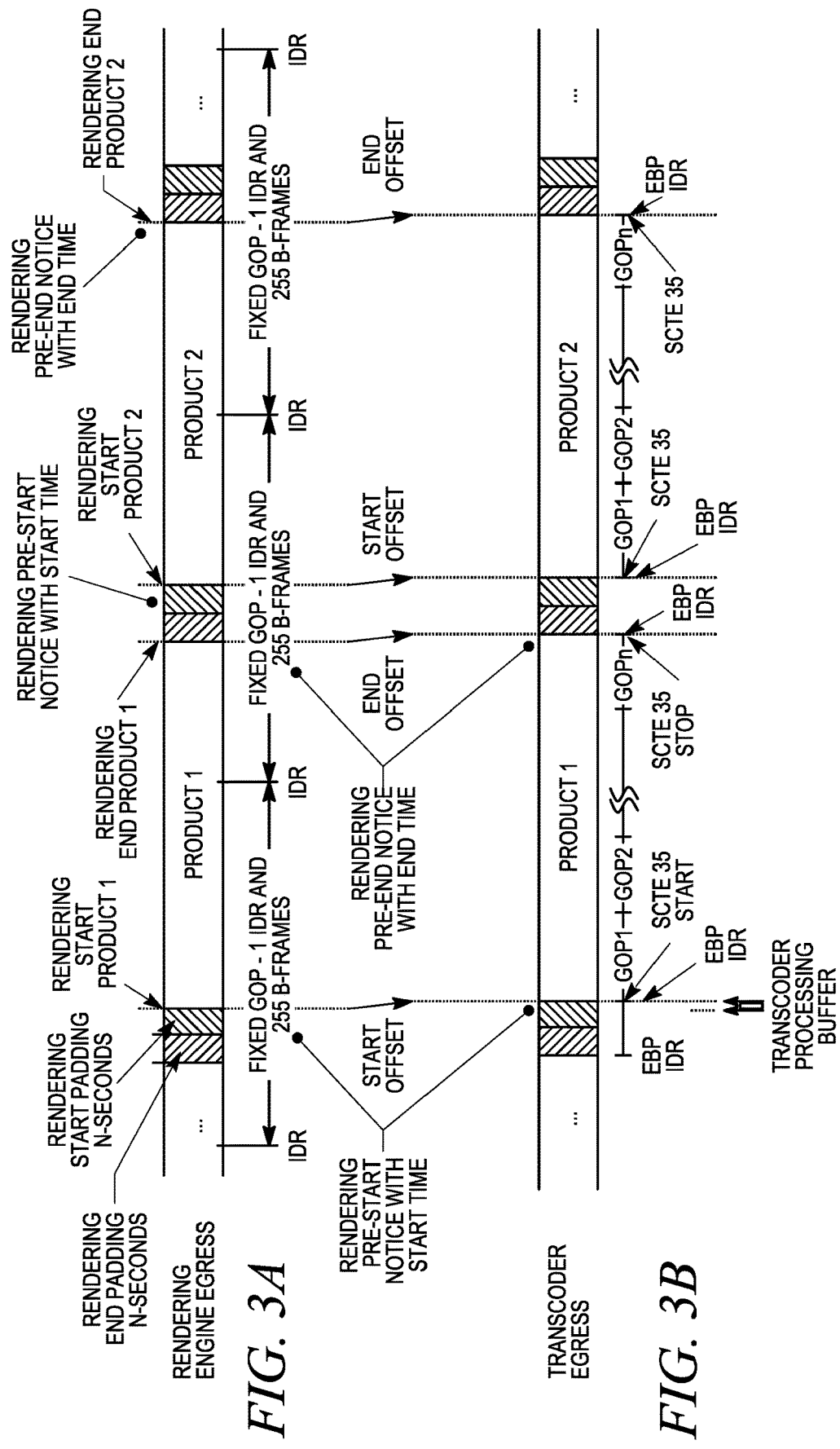
FIG. 3A shows one example of an MPEG transport stream output by the video product generator 210.
FIG. 3B shows the MPEG transport stream of FIG. 3A after it has been processed by a transcoder.

FIG. 3A shows one example of an MPEG transport stream output by the video product generator 210. As shown, the video product generator 210 outputs an ongoing series of different VOD assets or products that it has been requested to process such as the illustrative VOD products 1 and 2. The actual start and end times for each VOD product are also shown, both of which are offset by a small amount of time (e.g., a few milliseconds) to account for processing delays (due to e.g., network delays, internal buffering delays, etc.) between the time the VOD product leaves the video product generator 210 and the time the transcoder 235 actually begins processing the VOD product. Also shown are the times for the pre-start and pre-end timing notices that the video product generator 210 sends to the VPC 220. A padding duration of n seconds (e.g., 2 seconds) exists between the pre-start time and the actual start time as well as between the pre-end times and the actual end time. Also shown in FIG. 3A are the locations of the IRD frames in the MPEG transport stream, which denote the beginning of a Group of Pictures (GOPs). In this example a single GOP has a duration of 8.53 seconds and includes an Instantaneous Decoding Refresh (IDR) frame and 255 B-frames. It should be noted that the IDR frames are not yet aligned with the actual start and stop times of the individual VOD products.

Returning to FIG. 2, given the information from the video product generator 210, the VPC 220 is able to calculate appropriate times at which the transcoder 235 should insert IDR frames (e.g., key frames, I frames) and encoder boundary points (for denoting boundaries between chunks), which are communicated by the VPC 220 to the transcoder 235 at 5. The encoder boundary points and IRD frames will generally be calculated so that one pair of each will be located at the offset start and offset end times of each VOD product.

An IDR frame will also be located at the beginning of each GOP. Encoder boundary points may be designated by a suitable in-band signaling marker such as an SCTE-104 marker. The VPC 220 will also instruct the transcoder 235 to insert suitable in-band signaling markers such as SCTE-35 markers to designate the offset start and offset end times of each VOD product. FIG. 3B shows the MPEG transport stream of FIG. 3A after it has been processed by the transcoder 235. As shown the IDR frames and the encoder boundary points are aligned with one another. Also shown are the SCTE-35 markers, which are located at the offset start and offset end times of each VOD product, as well as an IDR frame and encoder boundary point, which are also located at the offset start and offset end times.

Figure 3C:
FIG. 3C shows the video stream stored as stored by the ABR packager.
Figure 3C:
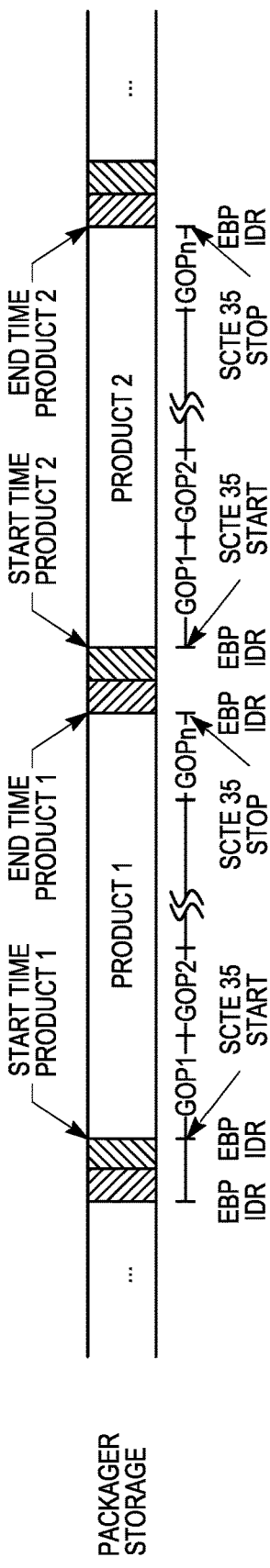
Figure 3D:
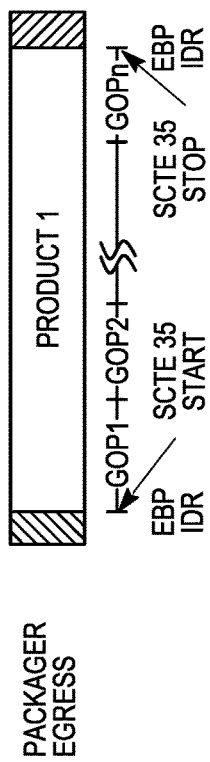
FIG. 3D shows an example of VOD product 1 that is provided by the ABR packager 240.
Figure 3E:
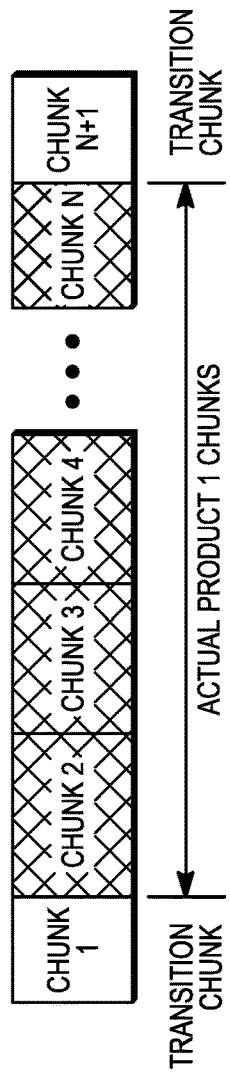
FIG. 3E shows the actual chunks that are represented by the preliminary ABR manifest that is provided by the ABR packager.
Figure 4A:
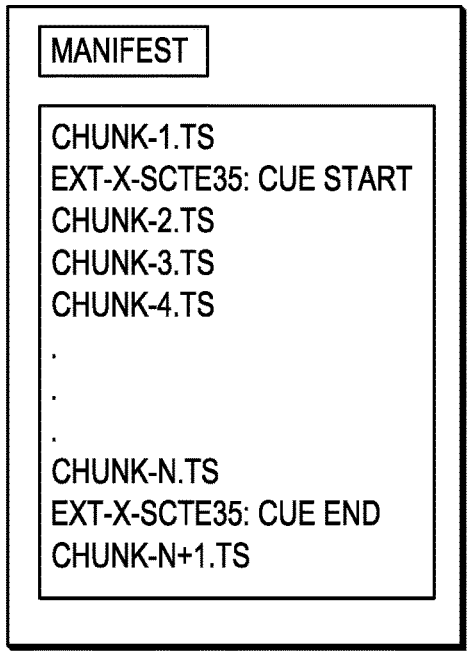
FIG. 4A shows an example of the preliminary ABR manifest for the VOD product 1 of FIG. 3D that is provided by the ABR packager.
Figure 4B:
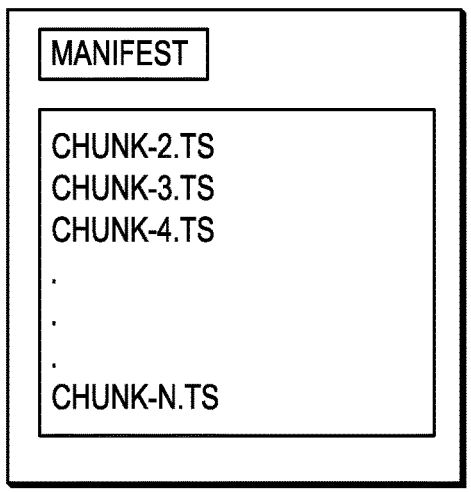
FIG. 4B shows the final VOD product manifest for VOD product 1 after it has been received and trimmed by the video product controller (VPC) so that it only includes the chunks for the VOD product.

The output from the transcoder 235 is communicated to the ABR packager 240 over one or more networks such as the illustrative IP multicast network 214. In some cases the IP multicast network 214 may be the same in whole or in part as IP multicast network 212. The ABR packager 240 prepares a preliminary version of the manifest for each VOD product. The video stream stored by the ABR packager 240 is shown in FIG. 3C. The VPC 220 requests receipt of that preliminary manifest at 6 by requesting that the manifest be expanded beyond the actual start and end times. An example of VOD product 1 that is sent by the ABR packager 240 at 7 is shown FIG. 3D. FIG. 4A shows an example of the manifest for this VOD product that is provided by the ABR packager 240. As FIG. 4A illustrates, the preliminary manifest includes at least one chunk before the product start time and at least one chunk beyond the product end time. FIG. 3E shows the actual chunks that are represented by the preliminary manifest. FIG. 4B shows the final VOD product manifest after it has been received and trimmed by the VPC 220 so that it only includes the chunks for the VOD product. Once the final VOD product manifest is ready, the VPC 220 notifies the PRC 225 at 8, which in turn notifies the PEC 230 at 9.

The VPC 220 may then make the VOD product manifest available to a variety of external systems and devices. For instance, the VOD product manifest may be provided to one or more of the systems or components of the ABR content delivery system 120. In particular, in the example shown in FIG. 2, the VOD product manifest may be provided to the manifest delivery controller (MDC) 260, which is used to deliver manifests to ABR client devices upon request and to stitch together different product manifests for delivery to ABR client devices as a linear stream. As further indicated in FIG. 2, in some cases the VOD product manifests may be provided by the VPC 220 directly to one or more client devices 102.

In some cases the VPC 220 may need to produce to different variants of the VOD product manifests for different CDNs that are to deliver the ABR video streams to the client devices. For instance, variant VOD product manifests may need to be provided for CDNs that employ different delivery protocols (e.g., HTTP, HTTPS).

The VPC 220 may optionally send the VOD product manifest to an ABR-to-file conversion engine 245, a quality control and verification engine 250 and a long-term archive 255. The VPC 220 may also cause the ABR packager 240 to send the ABR video streams to be communicated to these systems as well. The ABR-to-file conversion engine 245 converts the VOD product to a file such as an MP4 file so that the product is available for other uses. In this way, for instance, the VOD product may be syndicated through an RSS feed or otherwise published for other purposes. The quality control and verification engine 250 validates that the chunks for the VOD product are equal in duration and that all bit rates for the product have been produced correctly. It also validates that all appropriate start and end markers are found in the manifest and it may verify that the video and audio quality meets expectations.

As previously mentioned, in one embodiment the VPC 220 may include the functional components or modules shown in FIG. 2. The manner in which the various functions of the VPC 220 may be divided among these components or modules will now be discussed.

The VOD product creation controller 221 serves as the overall manager of the video product creation process. Among other things, it:

- receives the start and end notices from the video product generators 210;
- calculates appropriate times to use for triggering encoder boundary points and Key Frames in the MPEG transport streams via API calls to the transcoders 235, which drives the ABR packager 240 to create clean ABR media segment boundaries at the start and end of the VOD products;
- triggers the transcoder 235 to place SCTE-35 messages into the MPEG transport streams that are produced, where the start and end cue markers in the produced ABR manifest serve as bookends for the VOD products;
- calculates appropriate times to pull the ABR manifests from the packager 240 for validation;
- trims the manifests from the packager 240 to the specific chunks representing the actual VOD product;
- stores the trimmed manifests for later serving by the VOD manifest service 225; and
- triggers a validation process once the product is complete, and if problems are found, it will generate an error that will cause the product to be re-rendered.

The VOD verification controller 222, among other things, may:

- validate that the video chunks of the VOD product are as expected;
- validate that all bit rates for the VOD product has been produced correctly;
- validate that appropriate start and end cue markers are found in the manifests pulled from the packager 240; and
- optionally call an external media verification engine 250 to confirm that the video and audio quality meets expectations.

The scheduler 223, among other things, may be used to schedule asynchronous activities such as product validations, media conversions and long-term storage and Time-To-Live (TTL) requirements of the VOD products. The scheduler 223 may also assign a validity period to select categories of VOD products (e.g., weather, news, traffic, etc.) and set a time-to-live to specific VOD products in each of the select categories when the VOD products are delivered to a content delivery network. The scheduler 223 may also be used to manage the periodic (e.g., daily, weekly) operational activities that keep the system efficiently running. Such activities may include removal of expired products, engine restarts as needed, database cleanup and log cleanup.

The notification service 224, among other things, may queue and deliver notifications to the PEC 230 and other systems when VOD products are successfully processed or when an error occurs. The VOD manifest service 225, among other things, may be used to:

- cache and serve VOD products that are created;
- handle requests to serve VOD products using both http and https protocol variants;
- enable VOD products to be delivered over various CDNs by providing updates to the media chunk URLs based on a received URL parameter;
- allow the designation of a default CDN serving path for media chunks if none is otherwise specified.

Figure 5:
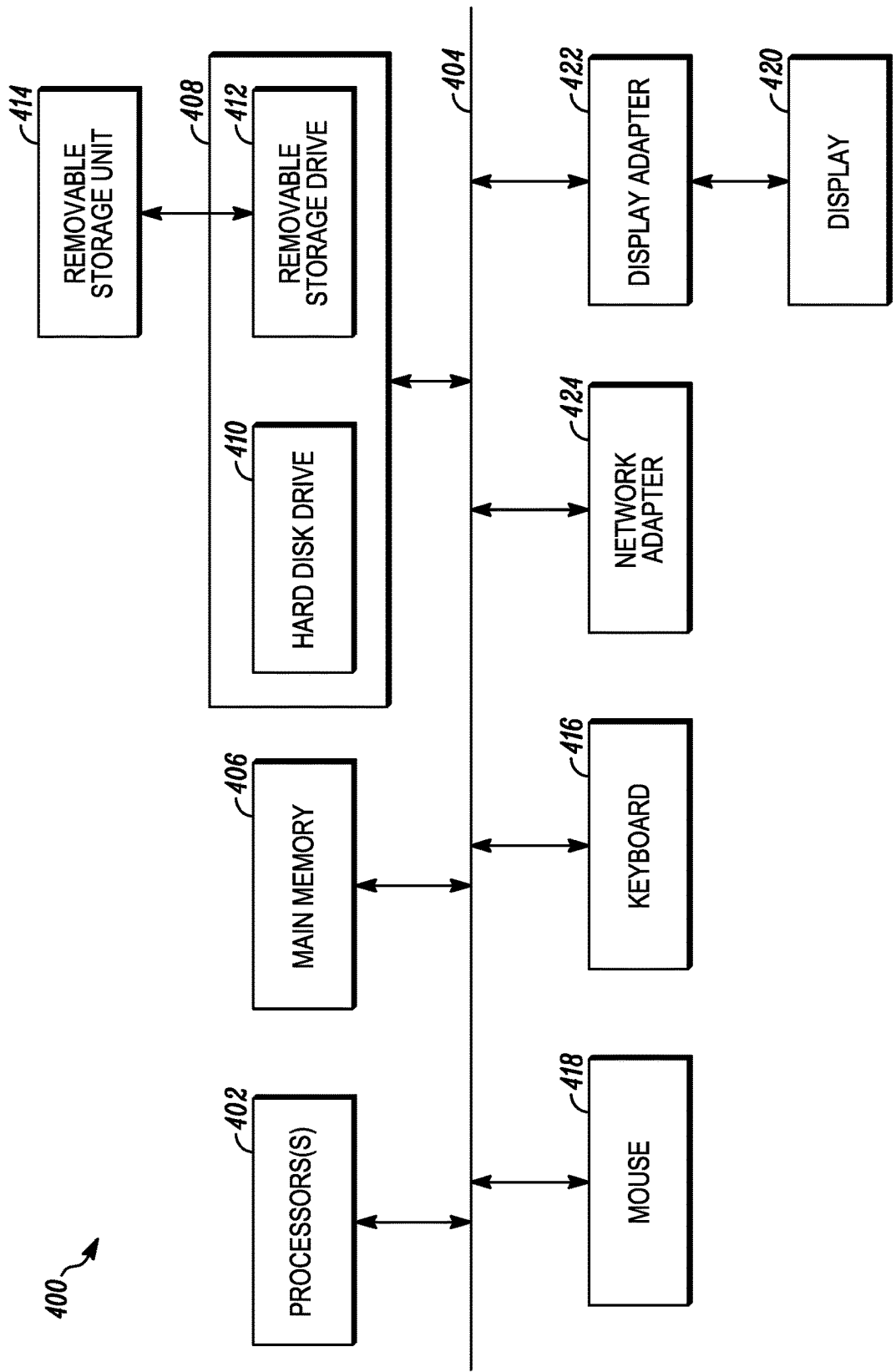
FIG. 5 illustrates a block diagram of one example of a computing apparatus that may be configured to implement or execute one or more of the processes performed by any of the various devices shown herein, including but not limited to the VPC.

FIG. 5 illustrates a block diagram of one example of a computing apparatus 400 that may be configured to implement or execute one or more of the processes performed by any of the various devices shown herein, including but not limited to the VPC 220. It should be understood that the illustration of the computing apparatus 400 is a generalized illustration and that the computing apparatus 400 may include additional components and that some of the components described may be removed and/or modified without departing from a scope of the computing apparatus 400.

The computing apparatus 400 includes a processor 402 that may implement or execute some or all of the steps described in the methods described herein. Commands and data from the processor 402 are communicated over a communication bus 404. The computing apparatus 400 also includes a main memory 406, such as a random access memory (RAM), where the program code for the processor 402, may be executed during runtime, and a secondary memory 408. The secondary memory 408 includes, for example, one or more hard disk drives 410 and/or a removable storage drive 412, where a copy of the program code for one or more of the processes described herein may be stored. The removable storage drive 412 reads from and/or writes to a removable storage unit 614 in a well-known manner.

As disclosed herein, the term "memory," "memory unit," "storage drive or unit" or the like may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, a SIM card, other smart cards, and various other mediums capable of storing, containing, or carrying instructions or data. However, computer readable storage media do not include transitory forms of storage such as propagating signals, for example.

User input and output devices may include a keyboard 616, a mouse 618, and a display 620. A display adaptor 622 may interface with the communication bus 604 and the display 620 and may receive display data from the processor 602 and convert the display data into display commands for the display 620. In addition, the processor(s) 602 may communicate over a network, for instance, the Internet, LAN, etc., through a network adaptor 624.

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media.

Moreover, as used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between to or more computers. All functions performed by the various components, modules, engines, systems, apparatus, interfaces or the like may be collectively performed by a single processor or each component, module, engine, system, apparatus, interface or the like may have a separate processor.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein may be combined to achieve a particular functionality can be seen as "associated with" each other such that the desired functionality is achieved, irrespective of architectures or intermediary components. Likewise, any two components so associated can also be viewed as being "operably connected", or "operably coupled", to each other to achieve the desired functionality.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the embodiments of the invention.

The invention claimed is:

1. A method for coordinating preparation of video-on-demand (VOD) products that are to be delivered as adaptive-bit-rate (ABR) video streams, the method comprising:
   receiving from a video product generator a respective start time and a respective stop time for each of a plurality of source assets sequentially inserted by the video product generator into a source video transport stream, each source asset associated with a respectively different VOD product to be provided from a transcoder by transcoding the source video transport stream into a transcoded video transport stream;
   responsive to receipt of the respective start time and respective stop times time for each source asset, for each VOD product, instructing a transcoder to insert into its associated transcoded video transport stream encoder boundary points and Instantaneous Decoding Refresh (IDR) frames at specified times in each of the VOD products, the specified times including an offset start time and an offset stop time of each of the VOD products, each offset start time being equal to the start time plus an additional time period based on processing delays arising between a time when the VOD products exit the video product generator and a time the transcoder begins processing the VOD products, the offset stop time being equal to the stop time plus the additional time period;
   responsive to receipt of the start time and the stop time for each of the source assets, further instructing the transcoder to insert into the video transport stream for each of the VOD products in-band signaling markers denoting the respective offset start time and offset stop time of each of the VOD products;
   requesting a preliminary ABR manifest for each of the VOD products from an ABR packager that packages the VOD products received by the ABR packager from the transcoder, the request for the preliminary manifest specifying manifest start and stop times that are expanded beyond the respective actual start and actual stop times for each of the VOD products; and
   trimming the preliminary manifests received from the ABR packager so that each preliminary manifest only includes ABR chunks for a respective one of the VOD products to thereby produce final VOD product ABR manifests.

2. The method of claim 1 wherein instructing the transcoder to insert into a video transport stream for each of the VOD products encoder boundary points and IDR frames includes calculating the specified times at which the encoder boundary points and Instantaneous Decoding Refresh (IDR) frames are to be inserted in the video transport stream for each of the VOD products.

3. The method of claim 1, further comprising storing each of the final VOD product ABR manifests so that the final VOD product ABR manifests are able to be subsequently served to requesting systems or devices.

4. The method of claim 1, further comprising causing ABR video streams for at least some of the VOD products to be converted to one or more alternative delivery formats.

5. The method of claim 1, further comprising causing the final VOD product ABR manifests and ABR video streams associated therewith to undergo a validation process.

6. The method of claim 1, further comprising notifying a product rendering scheduler when processing of the VOD products is complete.

7. The method of claim 1, further comprising serving a selected one or more of the final VOD product ABR manifests to a manifest delivery controller that delivers ABR manifests to client devices.

8. The method of claim 1, further comprising providing final VOD product ABR manifest variants for different content delivery networks (CDNs) that are to deliver the ABR video streams to the client devices.

9. The method of claim 8, wherein the final VOD product ABR manifest variants are provided for different delivery protocols.

10. The method of claim 1, further comprising assigning a validity period to select categories of VOD products and setting a time-to-live to specific VOD products in each of the select categories when the VOD products are delivered to a content delivery network.

11. A video product controller having non-transitory memory storing instructions for a controller configured to:
   receive from a video product generator a respective start time and a respective stop time for each of a plurality of source assets sequentially inserted by the video product generator into a source video transport stream, each source asset associated with a respectively different VOD product to be provided from a transcoder by transcoding the source video transport stream into a transcoded video transport stream;
   responsive to receipt of the respective start time and respective stop time for each source asset, for each VOD product, instructing a transcoder to insert into its associated transcoded video transport stream encoder boundary points and Instantaneous Decoding Refresh (IDR) frames at specified times in each of the VOD products, the specified times including an offset start time and an offset stop time of each of the VOD products, each offset start time being equal to the start time plus an additional time period based on processing delays arising between a time when the VOD products exit the video product generator and a time the transcoder begins processing the VOD products, the offset stop time being equal to the stop time plus the additional time period;

responsive to receipt of the start time and the stop time for each of the source assets, further instructing the transcoder to insert into the video transport stream for each of the VOD products in-band signaling markers denoting the respective offset start time and offset stop time of each of the VOD products;

requesting a preliminary ABR manifest for each of the VOD products from an ABR packager that packages the VOD products received by the ABR packager from the transcoder, the request for the preliminary manifest specifying manifest start and stop times that are expanded beyond the respective actual start and actual stop times for each of the VOD products; and trimming the preliminary manifests received from the ABR packager so that each preliminary manifest only includes ABR chunks for a respective one of the VOD products to thereby produce final VOD product ABR manifests.

12. The apparatus of claim 11, wherein the computer program code further causes said at least one processor to calculate the specified times at which the encoder boundary points and Instantaneous Decoding Refresh (IDR) frames are to be inserted in the video transport stream for each of the VOD products.

13. The apparatus of claim 11, wherein the computer program code further causes said at least one processor to store each of the final VOD product ABR manifests so that the final VOD product ABR manifests are able to be subsequently served to requesting systems or devices.

14. The apparatus of claim 11, wherein the computer program code further causes said at least one processor to cause ABR video streams for at least some of the VOD products to be converted to one or more alternative delivery formats.

15. The apparatus of claim 11, wherein the computer program code further causes said at least one processor to cause the final VOD product ABR manifests and ABR video streams associated therewith to undergo a validation process.

16. The apparatus of claim 11, wherein the computer program code further causes said at least one processor to notify a product rendering scheduler when processing of the VOD products is complete.

17. The apparatus of claim 11, wherein the computer program code further causes said at least one processor to serve a selected one or more of the final VOD product ABR manifests to a manifest delivery controller that delivers ABR manifests to client devices.

18. The apparatus of claim 11, wherein the computer program code further causes said at least one processor to provide final VOD product ABR manifest variants for different content delivery networks (CDNs) that are to deliver the ABR video streams to the client devices.

19. The apparatus of claim 11, wherein the final VOD product ABR manifest variants are provided for different delivery protocols.

20. The apparatus of claim 11, wherein the computer program code further causes said at least one processor to assign a validity period to select categories of VOD products and setting a time-to-live to specific VOD products in each of the select categories when the VOD products are delivered to a content delivery network.

* * * * *